US 7,848,287 B2

(12) United States Patent
Diachina et al.

(10) Patent No.: US 7,848,287 B2
(45) Date of Patent: Dec. 7, 2010

(54) BI-DIRECTIONAL RLC NON-PERSISTENT MODE FOR LOW DELAY SERVICES

(75) Inventors: John W. Diachina, Garner, NC (US); Håkan E Axelsson, Linköping (SE); Paul Schliwa-Bertling, Ljungsbro (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 612 days.

(21) Appl. No.: 11/684,020

(22) Filed: Mar. 9, 2007

(65) Prior Publication Data

US 2007/0268861 A1 Nov. 22, 2007

Related U.S. Application Data

(60) Provisional application No. 60/800,760, filed on May 16, 2006.

(51) Int. Cl.
*H04W 4/00* (2009.01)
*H04L 1/00* (2006.01)
*H04J 3/16* (2006.01)

(52) U.S. Cl. .................. 370/329; 370/252; 370/468
(58) Field of Classification Search ............... 370/229, 370/230, 235, 242, 248, 252, 329, 468
See application file for complete search history.

(56) References Cited

U.S. PATENT DOCUMENTS

| 6,519,223 | B1 | 2/2003 | Wager et al. | |
|---|---|---|---|---|
| 6,937,564 | B2 * | 8/2005 | Anttila | 370/230 |
| 6,999,447 | B2 * | 2/2006 | D'Amico et al. | 370/349 |
| 2005/0169207 | A1 * | 8/2005 | Muniere | 370/328 |
| 2006/0098574 | A1 * | 5/2006 | Yi et al. | 370/236 |
| 2006/0146745 | A1 * | 7/2006 | Cai et al. | 370/328 |

FOREIGN PATENT DOCUMENTS

WO 2005/064840 A1 7/2005

OTHER PUBLICATIONS

3GPP release 6.11.0 dated Jan. 2005 available at www.3gpp.prg.*
Miyazaki, A. et al. "RTP Payload Type Format to Enable Selective Retransmissions." IETF Internet Draft, Audio Video Transport Working Group, Mar. 1, 2000. Available at: http://www.ietf.org/proceedings/00dec/I-D/draft-ietf-avt-rtp-se;ret-00.txt. XP-002242430.

* cited by examiner

*Primary Examiner*—Nick Corsaro
*Assistant Examiner*—Manpreet S Matharu
(74) *Attorney, Agent, or Firm*—Coats & Bennett, PLLC (57) ABSTRACT

The transfer delay QoS attribute for delay-sensitive applications is enforced in radio access networks by determining the ongoing validity of incomplete data packets based on a maximum data transfer delay constraint. According to one embodiment, upper-layer packet data units (PDUs) associated with an application having a maximum data transfer delay constraint are transferred by starting a timer responsive to initial transmission of an RLC data block associated with one or more of the upper-layer PDUs. The timer is initialized to a timer value that is based on the maximum data transfer delay constraint. The RLC data block is retransmitted responsive to a received message indicating reception of the RLC data block is unacknowledged so long as the timer has not expired. The RLC data block is deleted from memory responsive to the timer expiring or a received message indicating reception of the RLC data block is acknowledged.

28 Claims, 3 Drawing Sheets

BI-DIRECTIONAL RLC NON-PERSISTENT MODE FOR LOW DELAY SERVICES

CROSS REFERENCE TO RELATED APPLICATIONS

This application claims the benefit of U.S. Provisional Application No. 60/800,760, filed May 16, 2006, which is incorporated herein by reference in its entirety.

BACKGROUND

The present invention generally relates to radio access networks, and particularly relates to maintaining Quality-of-Service (QoS) for delay-sensitive applications such as Voice-over IP (VoIP) serviced by radio access networks.

Some radio access networks route data in packets. For example, a packet switched radio service such as the General Packet Radio Service (GPRS) is added onto an existing circuit-switched network such as the Global System for Mobile Communications (GSM) network to provide both circuit and packet switched communication services. Enhanced Data rates for GSM Evolution (EDGE) or Enhanced GPRS (EG-PRS) is a digital mobile phone technology that allows for increased data transmission rates and improved data transmission reliability in GPRS/GSM networks. EDGE employs an 8-PSK modulation scheme which carries three times more information through an extended signal constellation.

GPRS/EDGE radio networks (GERANs) include a gateway GPRS support node (GGSN) and a serving GPRS support node (SGSN) for supporting packet switched communication. The GGSN provides a gateway between the radio network and the public switched packet data network and/or other GPRS networks. The GGSN implements authentication and location management functions. The SGSN controls connections between the radio network and mobile stations. The SGSN performs session management and GPRS mobility management such as handovers and paging. The Base Station Subsystem (BSS) component of a circuit-switched GSM network is updated to support packet switched data communication. For example, a Packet Control Unit (PCU) is provided for converting packet data into a format that can be transferred over the air interface to mobile stations.

Packet data is carried across several interfaces in a GERAN. At each interface, data is packetized according to a particular protocol. For example, application data is sent to a GERAN over the Internet as an IP datagram. The IP datagram is received at the GGSN as a Network Data Packet Unit (N-PDU) which is addressed to a particular IP address. The GGSN encapsulates the N-PDU using the GPRS tunneling protocol (GTP) by adding a GTP header that enables the possibility to tunnel the N-PDUs across GPRS core network. The GTP-PDU is passed to the UDP layer. The UDP layer adds an UDP header to the PDU. The header indicates source and destination port addresses. The UDP-PDU is then forwarded to an IP layer. The IP layer adds SGSN source and destination addresses. The IP layer segments the PDU into smaller units if the PDU is too long.

The IP-PDU is transferred to the SGSN where it is treated as an N-PDU. The SGSN removes the various headers added by the GGSN and provides the N-PDU to a Sub Network Dependent Convergence Protocol (SNDCP) layer. The SNDCP layer converts the N-PDU into a format compatible with the underlying GPRS network architecture. Upon completion, the SNDCP-PDU is passed to a Logical Link Control (LLC) layer. The LLC layer provides a logical connection between the SGSN and mobile stations served by the GERAN. The LLC layer encapsulates the SNDCP-PDU with an LLC header. A Base Station System GPRS Protocol (BSSGP) layer is located directly below the LLC layer and provides routing information so that the LLC-DPU is properly routed to the BSS (e.g. over a frame relay physical layer). The BSSGP operates between the SGSN and the BSS, i.e., the BSSGP does not extend over the air interface.

At the BSS, the LLC-PDU is provided to the Radio Link Control (RLC) layer. The RLC layer establishes a reliable link (e.g. if required by the QoS of the corresponding packet switched service) between the BSS and mobile station. The RLC layer performs segmentation and reassembly of upper-layer PDUs (LLC PDUs in this example) into RLC data blocks. As used herein, the term "upper-layer" means protocol layers above the RLC layer. RLC data blocks consist of an RLC header, an RLC data unit, and spare bits. The RLC data blocks are then passed to a Medium Access Control (MAC) layer which encapsulates the blocks with MAC headers. The MAC layer controls access signaling across the air interface, including the assignment of uplink and downlink radio blocks which are used to carry the RLC data blocks. The data is then transmitted to a mobile station over the air interface via the physical layer. To this end, a Temporary Block Flow (TBF) is established between the BSS and mobile station. The TBF is a logical connection between the BSS and mobile station over which the data is transferred. One or more dynamic (shared) or fixed (dedicated) packet data channels (timeslots) may be assigned when a TBF is established. At the mobile station, the data is received at the physical layer and encapsulation headers are removed from the received data as it moves up the mobile station protocol stack. Eventually, the original application data is received at the application layer.

However, the mobile station may not receive all RLC data blocks after initial transmission by the BSS, e.g., due to poor radio conditions, transmission errors, etc. Similarly, the BSS may not receive the initial transmission of any given RLC data block sent by a mobile station. An RLC data block is considered received when it is received in a layer 1 frame with consistent parity bits as defined in Release 7 of the 3rd Generation Partnership Project RLC/MAC Protocol (3GPP TS 44.060 V7.7.0). RLC data blocks may also be received out-of-order. Each transmitted RLC data block has a sequence number indicating the position of that RLC data block within a sequence of RLC data blocks.

Release 7 of the 3GPP RLC/MAC Protocol enables an RLC receiver endpoint to handle missing RLC data blocks in one of three ways. Case 1; When operating in RLC acknowledged mode, the RLC receiver endpoint sends a packet acknowledged/not acknowledged (ACK/NACK) message to the RLC transmitter endpoint indicating which RLC data blocks are missing. The RLC transmitter endpoint then re-transmits the missing RLC data blocks. Missing RLC data blocks are retransmitted indefinitely in RLC acknowledged mode though the RLC protocol may experience stalling should the number of outstanding (unacknowledged) RLC data blocks grow too large at the RLC transmitting endpoint. Case 2; The RLC transmitter endpoint does not re-transmit any RLC data blocks when operating in RLC unacknowledged mode. Accordingly, in RLC unacknowledged mode missing RLC data blocks are ignored at the RLC receiver endpoint. Case 3; In RLC non-persistent mode, a limited number of RLC data block retransmissions are possible. However, it is not required that all RLC data blocks be correctly received at the RLC receiver endpoint.

For RLC acknowledged mode, the RLC endpoints maintain a sliding window of RLC data blocks based on block sequence numbers (BSN). The sliding window has a predefined width (e.g., 64 blocks for GPRS and 64 to 1024 blocks for EDGE). The RLC receiver endpoint continues to request retransmission of all missing RLC data blocks within the sliding window via a packet ACK/NACK message. This conventional sliding window based approach associated with RLC acknowledged mode is also used for RLC non-persistent mode. The conventional sliding window based approach is used for determining which RLC data block should be negatively acknowledged (NACK) by the receiving RLC endpoint or re-transmitted by the transmitting RLC endpoint. However, it creates QoS issues for delay-sensitive applications such as VoIP given the relatively long round-trip signal propagation times associated with the receiving RLC endpoint sending a NACK to transmitting RLC endpoint and the subsequent retransmission of missing RLC data blocks. Delay-sensitive applications such as VoIP have maximum packet data transfer delay constraints that must be met to assure sufficient QoS from a user perspective. For example, maximum mouth-to-ear speech frame propagation for VoIP is typically 300 ms or less. Missing speech frames received after a 300 ms delay may result in user perception of degraded speech call quality.

For example, based on current radio conditions, a low-throughput Modulation and Coding Scheme (e.g., MCS-1) is selected as the coding scheme for a bi-directional TBF established to support a VoIP service. A particular form of header compression (e.g. robust header compression or ROHC) is also negotiated when the TBF is established (e.g. by the SNDCP layer). Accordingly, one or more RLC data blocks are transmitted over the air interface for each RTP/UDP/IP PDU with header compression being applied by SNDCP (i.e. for VoIP, the full protocol stack involves RTP/UDP/IP/SNDCP/LLC PDUs being carried by one or more RLC data blocks). Further, for packet services having a low transfer delay attribute (such as VoIP), RLC non-persistent mode is selected instead of RLC acknowledged in order to avoid issues resulting from considering all RLC data blocks covered by the sliding RLC window as inherently valid and always subject to re-transmission. This way, a limited number of retransmissions can be made (if necessary) for each RLC data block in an effort to achieve an acceptably low frame error rate without exceeding a maximum overall transfer delay as allowed by the VoIP application when conveying speech frames over the air interface. In other words, RLC non-persistent mode establishes the validity of RLC data based on considering a transfer delay threshold established at TBF set up time (applicable to both the receiving and transmitting RLC endpoints) while still maintaining the use of the sliding RLC window concept (but not using it to determine the validity of RLC data blocks).

An RLC window size is established by explicit control plane signaling and is configured for both RLC acknowledged mode and RLC non-persistent mode. Though still configured for RLC non-persistent mode, the RLC window size in this case is not used to determine whether or not a missing RLC data block having a sequence number within the sliding RLC window is considered as valid (i.e. still considered as expected by the receiving RLC endpoint and still considered as being subject to re-transmission by the transmitting RLC endpoint). To demonstrate how relying on a fixed RLC window size is not sufficient to determine the validity of missing RLC data blocks for delay sensitive applications (such as VoIP), the following example is presented.

A nominal fixed RLC window size can be established (at initial TBF establishment) based on the ratio X of RLC data blocks required to carry RTP/UDP/IP PDUs required for a given modulation and coding scheme (MCS). Assuming MCS-1, 20 ms of speech per speech (RTP) frame and X=2, the window size could, for example, be set to 8X, meaning 16 RLC data blocks carrying 8 RTP frames (RTP/UDP/IP PDUs) and therefore speech payload as old as 160 ms would be considered valid. As time progresses, radio conditions may improve so that the payload-bearing capacity of each RLC data block doubles (e.g., to MCS-4). At this point, the number of RLC data blocks required to transmit a RTP/UDP/IP PDU is cut in half (i.e. X reduces to 1). Thus, with up to 16 RLC data blocks permitted by the RLC window size, RTP frames as old as 320 ms would effectively be considered as valid based on the initially established window size. Such variations in the amount of time allowed for conveying RTP frames across the air interface can result in exceeding the QoS delay attribute for the VoIP application. Of course, radio conditions may improve beyond MCS-4 as considered here such that buffered RLC data blocks even older than 320 ms would then be considered as valid. This fixed RLC window size approach causes a similar issue at the RLC receiver endpoint where missing RLC data blocks are still expected even though they have been missing for a period of time that exceeds the QoS delay attribute for the VoIP application. It should also be noted that any attempt to dynamically re-negotiate the RLC window size as radio conditions change will in practice be too cumbersome (i.e., control plane signaling intensive) and may actually result in generating service interruptions that would be perceived as a reduced QoS experience.

The nominal fixed RLC window size approach can also cause RTP speech frames to be prematurely considered as no longer valid as shown in the following example. When the MCS coding scheme selected during initial TBF establishment is somewhat higher (e.g. MCS-4), an average of Y RLC data blocks are required to carry each RTP frame (RTP/UDP/IP PDU) transmitted over the air interface. Assuming MCS-4, 20 ms of speech per speech (RTP) frame and Y=1, the window size could, for example, be set to 8Y, meaning 8 RLC data blocks carrying 8 RTP frames (RTP/UDP/IP PDUs) and therefore speech payload as old as 160 ms would be considered valid. As time progresses, radio conditions may deteriorate so that the payload bearing capacity of each RLC data block is cut in half (e.g. to MCS-1). When this occurs, the number of RLC data blocks transmitted for each RTP/UDP/IP PDU doubles (i.e. Y increases to 2). Accordingly, the previously established window size now allows RLC data blocks containing speech payload no older than 80 ms to be considered as valid. Thus, when radio conditions deteriorate, the amount of time for which buffered RLC data blocks (at the transmitting RLC endpoint) or missing RLC data blocks (at the receiving RLC endpoint) are considered valid may be excessively small, resulting in an unnecessarily high speech frame error rate.

In another example, the MCS scheme, number of RLC data blocks per RTP/UDP/IP PDU, header compression, size of a speech sample carried by a single RTP frame and window size are the same as in the first two examples. However, we now consider a temporary stoppage in the flow of speech payload (e.g. when a user stops speaking). The fixed RLC window size approach will once again result in less than optimal performance as follows. When a user stops speaking, the RLC transmitter endpoint may still generate supervisory frames or 'keep alive' frames (i.e. Silence Descriptor frames also known as SID frames). Since SID frames contain less payload than RTP frames and are sent less often than RTP frames (e.g. the equivalent of every $8^{th}$ RTP frame), the overall rate at which RLC data blocks are transmitted is significantly reduced for the period of time where there are no actual speech frames requiring transmission. However, this may result in a reduced buffering demand which may in turn result in the RLC data blocks containing speech frame payload buffered before the silent period was entered as being considered as valid for an excessively long period of time because the RLC window size is fixed and it takes longer for the window edges to be reached (i.e. due to a reduced RLC data block throughput rate experienced during the silent period). Lengthening the time for which RLC data blocks (containing speech frame payload) are considered valid can therefore result in exceeding the QoS delay attribute for the VoIP application as described earlier. Once again, this same scenario can produce a similar issue at the RLC receiver endpoint where missing RLC data blocks are considered valid (i.e. still expected) for longer periods of time than they should be.

In yet another example, the MCS scheme, number of RLC data blocks per RTP/UDP/IP PDU, header compression, size of a speech sample carried by a single RTP frame and window size are the same as in the first two examples. However we now consider low header compression efficiency during TBF establishment typically followed by a subsequent increase (i.e. improvement) in compression efficiency as time goes by. Changes in compression efficiency may then also occur (e.g. due to cell change accomplished using handover) well after the VoIP session has been initially established and a good level of compression efficiency has been established. During periods of low compression efficiency, the number of RLC data blocks required to transmit each RTP/UDP/IP PDU is high (i.e. since RTP/UDP/IP PDUs are larger during periods of low compression efficiency). Further, the fixed RLC window size that is established at initial TBF establishment typically assumes relatively high compression efficiency as would be applicable during steady state conditions. Accordingly, during periods of low compression efficiency, RLC data blocks may quickly become considered as falling outside the fixed (but sliding) RLC window, and thus become treated as invalid (by both the transmitting and receiving RLC endpoints) when in reality they may be well within the transfer delay time allowed for by the delay QoS attribute of the corresponding VoIP application.

SUMMARY

According to the methods and apparatus taught herein, the transfer delay QoS for delay-sensitive packet services (such a VoIP) can be satisfied in radio access networks by determining the validity of packet data payload at both the receiving and transmitting RLC endpoints based on a maximum data transfer delay constraint instead of a sliding RLC window size approach. On the transmitter side, a timer-based packet buffering approach is employed when transmitting delay-sensitive packet data such as VoIP data packets. Transmitted packet data is buffered for a period of time determined by the transfer delay timer value established at initial TBF establishment (i.e. where the allocated transfer delay value is a reflection of the transfer delay QoS attribute for the packet data application supported by the allocated TBF). Buffered RLC data blocks are deleted after the corresponding transfer delay timer expires, thus preventing subsequent retransmission of the deleted (and no longer valid) RLC data blocks.

On the receiver side, a timer-based packet retransmission request approach is similarly employed when an RLC data block is detected as missing. An RLC data block detected as missing at the receiver is expected to be received until the corresponding transfer delay timer expires. The missing RLC data block is no longer expected to be received when its corresponding transfer delay timer expires. The corresponding application layer may then be provided with a partially completed version (i.e. an erroneous version) of the RTP/UDP/IP PDU for which one or more missing RLC data blocks are no longer expected.

The maximum data transfer delay constraint preferably depends on the application type. The data transfer delay over the air interface is approximately 100 ms for VoIP data packets. As such, transmitted RLC data blocks that remain buffered for about 100 ms after initial transmission are deleted from memory at the RLC transmitter endpoint. Similarly, RLC data blocks at the RLC receiver endpoint continue to be expected for approximately 100 ms after first being detected as missing after which they will be invalidated. In another embodiment, the value of the packet data transfer delay attribute is approximately three seconds or less for Multimedia Broadcast Multicast Service (MBMS) based applications.

According to one embodiment, upper-layer packet data units (PDUs) associated with an application having a maximum data transfer delay constraint are transferred by starting a timer responsive to initial transmission of an RLC data block associated with one or more upper-layer PDUs (e.g., LLC PDUs). The timer is initialized to a timer value that is based on the maximum data transfer delay constraint. So long as the timer has not expired, the RLC data block is retransmitted responsive to a received message indicating its reception is unacknowledged. The RLC data block is deleted from memory responsive to the timer expiring or a received message indicating its reception is acknowledged. The value of the timer may be determined upon initial TBF establishment (e.g. based on the transfer delay QoS attribute of the corresponding packet service).

According to another embodiment, the receiving RLC endpoint detects a missing RLC data block in the sequence of one or more transmitted RLC data blocks associated with the one or more upper-layer PDUs. A timer is started responsive to detecting the missing RLC data block. The timer is initialized to a timer value that is based on the maximum data transfer delay constraint. The missing RLC data block is expected to be received until the timer expires. The missing RLC data block may be deleted from memory at the point the timer expires.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
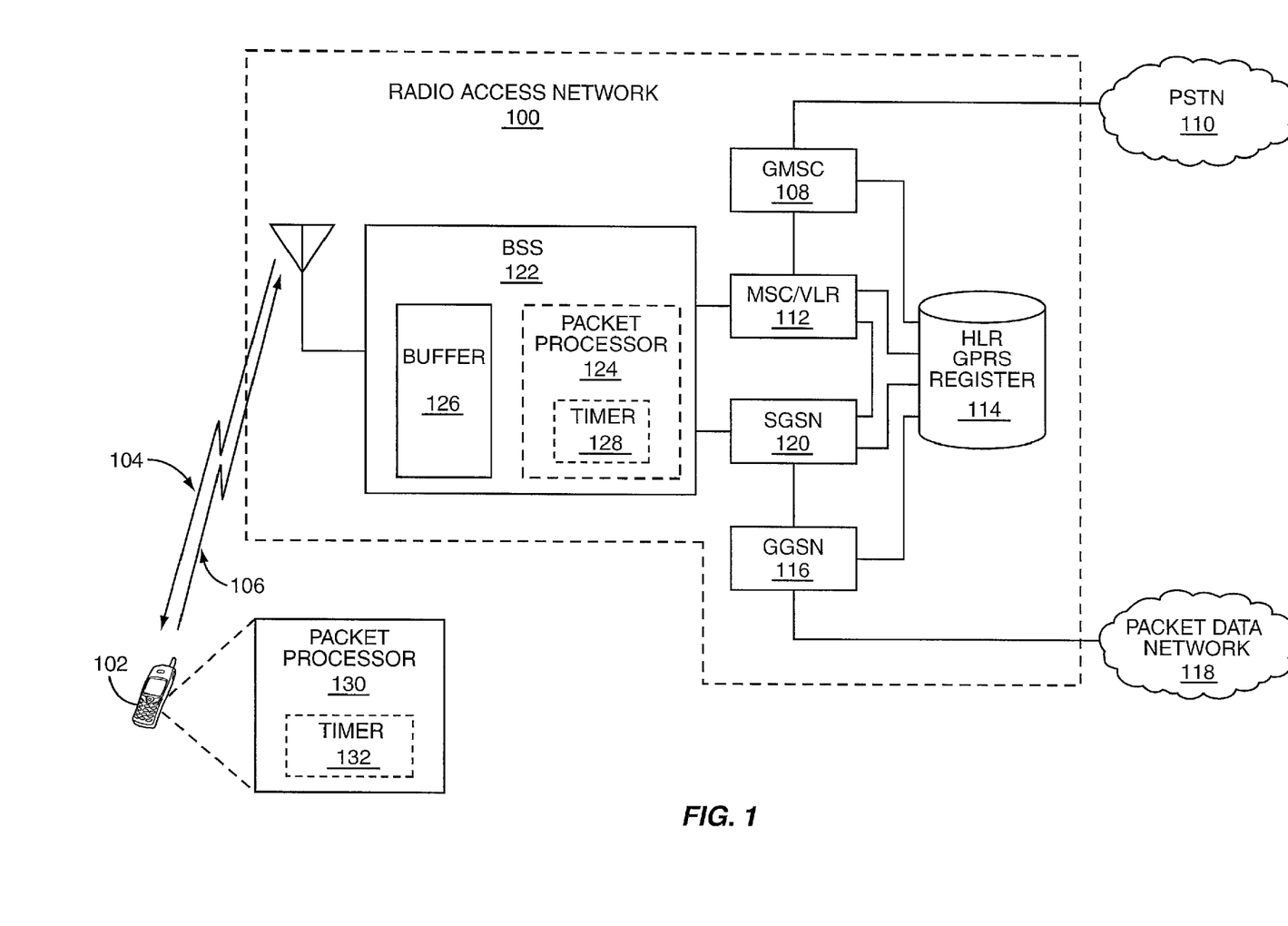
FIG. 1 is a block diagram of one embodiment of a radio access network.

FIG. 1 illustrates an embodiment of a GPRS/EDGE Radio Access Network (GERAN) 100. The GERAN 100 supports both circuit switched and packet switched communication. The GERAN 100 transmits data packets to a mobile device 102 such as a mobile phone over a downlink communication channel 104 also known as a downlink TBF. Of course, the GERAN 100 may transmit the same data packets to multiple devices (not shown) using a point-to-multipoint transmission approach such as Multimedia Broadcast Multicast Service (MBMS). For ease of explanation only, operation of the GERAN 100 is described herein with reference to a point-to-point communication link between the GERAN 100 and the single mobile device 102. However, those skilled in the art will readily recognize the techniques disclosed herein apply equally to point-to-multipoint transmission schemes.

The GERAN 100 implements a timer-based packet buffering approach when transmitting delay-sensitive data packets such as VoIP data packets. The timer-based packet buffering approach does not determine the ongoing validity of packet data based on whether or not the corresponding RLC data blocks remain within a sliding RLC window. Instead, transmitted data packets are buffered by the GERAN 100 for an amount of time determined by the transfer delay QoS attribute corresponding to the application being serviced. The transmission time constraint indicated by the application being serviced is referred to herein as maximum data transfer delay. Maximum data transfer delay corresponds to the maximum amount of time allowed for the transmission and reception of a data packet beyond which the packet is considered invalid and is determined by the transfer delay QoS attribute of the delay-sensitive application being serviced. At the transmitting RLC endpoint, located within either BSS 122 or mobile device 102, each transmitted upper layer PDU (i.e. an LLC PDU) is buffered (using one or more RLC data blocks) for an amount of time corresponding to the data transfer delay indicated by the application being serviced. A buffered RLC data block is deleted when stored longer than the allowed data transfer delay, thus ensuring adherence to the transfer delay QoS attribute of delay-sensitive applications as will be described in more detail later.

In the BSS 122, buffered RLC data blocks are available for retransmission upon request from the mobile device 102, e.g., in response to a packet being negatively acknowledged (i.e., responsive to a packet NACK message received from the mobile device 102 in RLC non-persistent mode). A packet NACK message indicates which RLC data blocks have not been received by the mobile device 102, e.g., because RLC data blocks have been received out-of-order at the mobile device 102. This way, the BSS 122 retransmits missing RLC data blocks to the mobile device 102 so long as the corresponding data transfer delay has not been exceeded. In addition, upon identifying an out-of-sequence RLC data block, the mobile device 102 starts a corresponding timer 132 used to determine the period of time for which it will continue to expect that missing RLC data block. When the timer 132 expires, the mobile device 102 no longer expects the missing RLC data block or any other additional RLC data blocks corresponding to the same upper layer PDU and may therefore generate an incomplete (i.e. erroneous) upper layer PDU. Generating an incomplete upper layer PDU may prove more beneficial than producing no upper layer PDU at all in this case. In one embodiment, the air interface data transfer delay is approximately 100 ms for VoIP data packets. Buffered VoIP data packets (i.e. all buffered RLC data blocks used to transmit a given VoIP data packet) are deleted if stored longer than 100 ms before a corresponding packet acknowledged (packet ACK) message is received from the mobile device 102, thus enforcing the QoS for the VoIP application.

The mobile device 102 implements a similar timer-based packet retransmission request approach for uplink communication. During uplink communication, the BSS 122 receives RLC data blocks from the mobile device 102 over an uplink communication channel 106 also known as an uplink TBF. According to this embodiment, the BSS 122 requests retransmission of missing RLC data blocks, e.g., by sending a packet NACK message to the mobile device 102. The BSS 122 expects to receive a missing RLC data block until the data transfer delay required by the application has been exceeded in a similar manner as previously described for packet data sent over the downlink communication channel 104. When this occurs, the BSS 122 no longer expects to receive the missing RLC data block or any other additional RLC data blocks corresponding to that same upper layer PDU and may therefore immediately generate an incomplete (i.e. erroneous) upper layer PDU.

The mobile device 102 implements the similar timer-based packet data buffering and retransmission request approaches used by the BSS 122 when servicing a delay-sensitive application. That is, the mobile device 102 stores RLC data blocks it transmits over the uplink communication channel 106 until the RLC data blocks are buffered longer than allowed by the maximum data transfer delay required by the application being serviced. RLC data blocks buffered longer than allowed as indicated by the data transfer delay are deleted. In a downlink configuration, the mobile device 102 expects to receive missing RLC data blocks over the downlink communication channel 104 until the maximum data transfer delay constraint is exceeded. RLC data blocks missing longer than indicated by the corresponding packet data transfer delay QoS attribute are no longer expected by the mobile device 102. This way, the transfer delay QoS attribute is enforced for the delay-sensitive application being serviced.

For example, a low-throughput Modulation and Coding Scheme such as MCS-1 may be used when radio conditions are poor. Each upper-layer Packet Data Unit (PDU) used to convey VoIP data such as an RTP/UDP/IP PDU may include 20 ms of speech data when encoded using MCS-1. The coding scheme may be upgraded when radio conditions improve, e.g., to MCS-4. The number of RLC data blocks needed to transmit upper-layer VoIP PDUs is cut in half when the coding scheming is upgraded from MCS-1 to MCS-4. The maximum data transfer delay constraint specified by the VoIP application therefore remains constant regardless of how radio conditions may change during the course of a delay-sensitive application.

In more detail, the GERAN 100 includes a GSM Gateway Mobile Switching Center (GMSC) 108 for providing a gateway between the GERAN 100 and the Public-Switched Telephone Network (PSTN) 110. The GERAN 100 also includes a Mobile services Switching Center (MSC) and a Visitor Location Register (VLR) 112 for supporting circuit-switched communication. The MSC/VLR 112 performs circuit switching functions, provides connections to other circuit-switched networks (not shown), and contains subscriber information necessary for providing circuit switched services. A central database 114 maintains the Home Location Register (HLR) which contains information associated with each mobile phone subscriber authorized to use the GERAN 100.

The GERAN 100 further includes complimentary components for supporting packet switched communication. A Gateway GPRS Support Node (GGSN) 116 provides a gateway between the GERAN 100 and the public switched packet data network 118 and/or other GPRS networks (not shown). The GGSN 116 implements authentication and location management functions. The GERAN 100 also includes a serving GPRS support node (SGSN) 120 that controls connections between the GERAN 100 and the mobile device 102. The SGSN 120 performs session management and GPRS mobility management such as handovers and paging. The SGSN 120 has access to a GPRS register maintained by the central database 114 which stores SGSN addresses and maintains GPRS subscriber data and routing information. The GERAN 100 further includes a Base Station Subsystem (BSS) 122 for handling traffic and signaling between the mobile device 102 and the GERAN 100. The BSS 122 transcodes speech channels, allocates radio channels, performs paging, manages quality of transmission and reception over the air interface and many other tasks related to the GERAN 100 as is well known in the art.

For ease of explanation only, operation of the BSS 122 and mobile device 102 is described next with reference to a downlink data packet transfer from the BSS 122 to mobile device 102. As such, the BSS 122 implements the timer-based packet buffering approach when transmitting data packets (carried using one or more RLC data blocks) to the mobile device 102. The mobile device 102 implements the timer-based retransmission request approach when receiving data packets from the BSS 122. However, in an uplink configuration, the timer-based packet data buffering approach is implemented by the mobile device 102 when the mobile device transmits data packets to the BSS 122. Correspondingly, in the uplink case, the BSS 122 implements the timer-based retransmission request approach when receiving data packets from the mobile device 102 over the uplink communication channel 106. With this understanding, the term "wireless receiver" as used herein shall mean the device receiving data packets (carried using one or more RLC data blocks) and the term "wireless transmitter" as used herein shall mean the device transmitting the data packets.

Turning now to the BSS 122, a processor 124 included in the BSS 122 manages data packet operations including protocol stack management. The BSS processor 124 may be fully implemented in hardware, partially in hardware and partially in software, or completely in software. Regardless, the BSS processor 124 enables coherent communication between the mobile device 102 and the SGSN 120. For example, the SGSN 120 communicates with the BSS 122 using an upper-layer protocol layer such as the Logical Link Control (LLC) protocol layer. The mobile station 102 communicates with the BSS 122 at a lower protocol layer such as the Medium Access Control (MAC) and RLC protocol layers. The BSS processor 124 converts upper-layer LLC PDUs to RLC and MAC blocks and vice-versa.

The BSS processor 124 also manages packet buffering when transmitting data packets (carried within one or more RLC data blocks) to the mobile device 102 over a fixed or dynamic downlink communication channel 104 such as a GPRS/EDGE packet data traffic channel (PDTCH). The BSS processor 124 generates RLC data blocks from application data such as VoIP packet data. Downlink VoIP packet data arrives at the GERAN 100 as an IP datagram. The GGSN 116 and SGSN 120 process the VoIP data which arrives at the BSS 122 as a group of LLC PDUs. The BSS processor 124 converts the LLC PDUs to RLC data blocks based on the BSS protocol stack. The BSS processor 124 then generates a Temporary Block Flow (TBF) establishment message, e.g., a packet downlink assignment message. The TBF establishment message is transmitted to the mobile device 102. In response, a TBF is established between the BSS 122 and mobile device 102 where the TBF is a dynamic physical connection over which the RLC data blocks are transferred.

Figure 2:
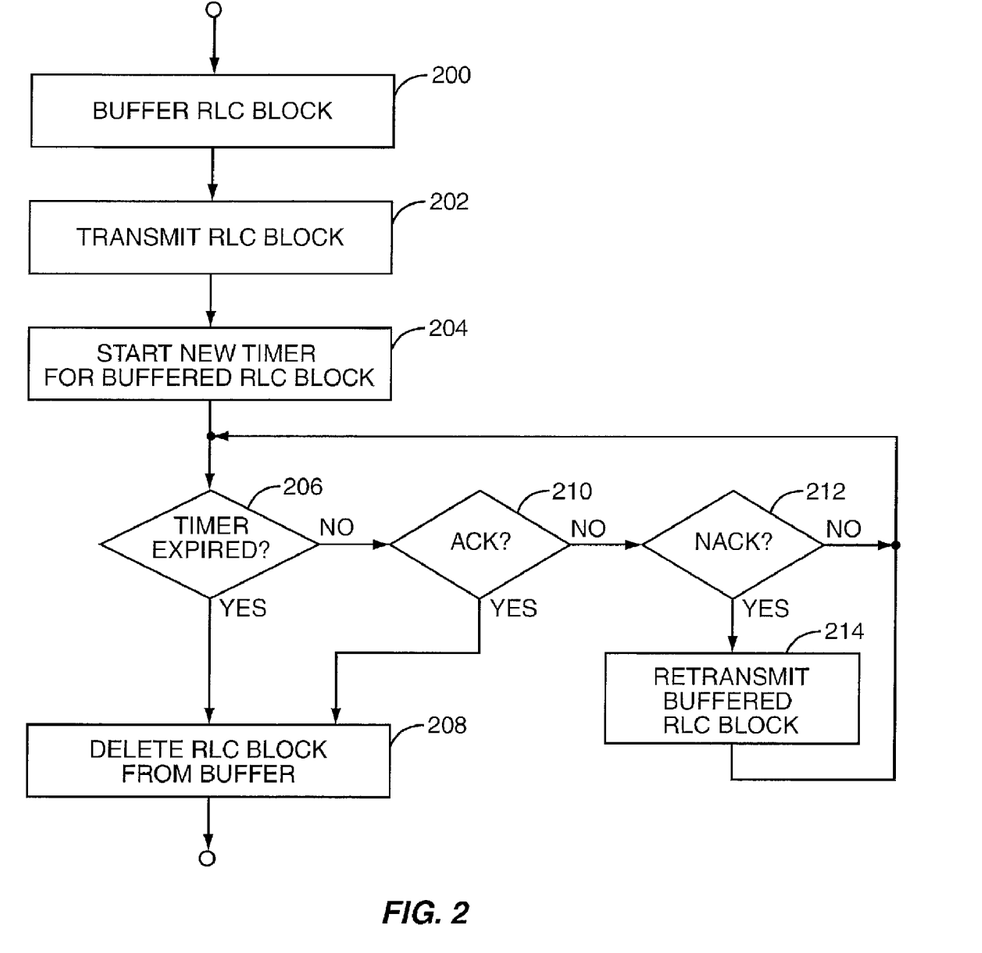
FIG. 2 illustrates an embodiment of processing logic for buffering transmitted data packets at a transmitter based on a maximum data transfer delay constraint.

Each RLC data block is stored in a buffer 126 included in the BSS 122 before it is transmitted, e.g., as illustrated by Step 200 of FIG. 2. The RLC data blocks are then transmitted over the downlink communication channel 104, e.g., as illustrated by Step 202 of FIG. 2. The BSS processor 124 starts a timer 128 included in or associated with the processor 124 each time an RLC data block is transmitted. The timer 128 is initialized to a value that is based on the maximum data transfer delay constraint for the corresponding VoIP application. The data transfer delay constraint may be derived from the transfer delay QoS attribute established as part of Packet Data Protocol (PDP) context data structure present at both the SGSN 120 and GGSN 116 which contains the subscriber's session QoS attributes applicable for each PDP Context activated. In one embodiment, the application is VoIP based and the data transfer delay is approximately 100 ms. Accordingly, the timer 128 is initialized to a value of approximately 100 ms. In another embodiment, the application is MBMS-based. According to this embodiment, the timer 128 is initialized to a data transfer delay value of approximately three seconds or less.

The timer 128 begins to countdown from its initialized state when the corresponding RLC data block is initially transmitted by the BSS 122, e.g., as illustrated by Step 204 of FIG. 2. The BSS processor 124 periodically monitors the current timer value for each transmitted RLC data block to determine whether one or more of the timers 128 have expired, e.g., as illustrated by Step 206 of FIG. 2. If an instance of timer 128 has expired, the BSS processor 124 deletes the corresponding RLC data block from the buffer 126, e.g., as illustrated by Step 208 of FIG. 2. This way, the RLC data block will not be retransmitted responsive to a subsequent packet NACK message received from the mobile device 102. The BSS processor 124 may start only one instance of timer 128 when the first of potentially multiple RLC data blocks required to transmit a given upper layer PDU is buffered since all of the RLC data blocks must be successfully transmitted to the RLC receiving endpoint before timer 128 expires (i.e. it may not be necessary to start an instance of timer 128 for each of these RLC data blocks).

The BSS processor 124 also removes an RLC data block from the transmit buffer 126 even before its timer 128 expires when a packet ACK message is received from the mobile device 102 indicating the RLC data block was received, e.g., as illustrated by Steps 210 and 208 of FIG. 2. A buffered RLC data block is retransmitted responsive to a packet NACK message if the message is received before the instance of timer 128 associated with the RLC data block expires, e.g., as illustrated by Steps 212 and 214 of FIG. 2. This way, an RLC data block identified as missing by the mobile device 102 may be retransmitted so long as the block's timer 128 has not expired.

The timer value used by the BSS processor 124 may either be explicitly transmitted to the mobile device 102 or derived from the transfer delay QoS attribute established at PDP Context activation time so the mobile device 102 can use it when processing the RLC data blocks transmitted by the BSS 122. The mobile device 102 may use the timer value to determine when to no longer expect a missing RLC data block. The mobile device 102 may also use the timer value to determine when the mobile device 102 should stop re-transmitting an RLC data block to the BSS 122 for which the BSS 122 has not yet acknowledged the corresponding reception. In one embodiment, the maximum data transfer delay constraint is provided to the mobile device 102, e.g., as part of the PDP context activation procedure used to determine the QoS attributes (including transfer delay) applicable to the TBFs (used in support of that PDP Context) over which the RLC data blocks are transmitted. In another embodiment, the timer value used by the BSS timer 128 is provided to the mobile device 102, e.g., as an IE portion of a message.

Regardless, the mobile device 102 is also instructed when to establish the ongoing validity of missing downlink RLC data blocks based on the maximum data transfer delay constraint. In one embodiment, the BSS processor 124 programs an IE in the TBF establishment message used to establish the downlink TBF over which the RLC data blocks are transmitted by the BSS 122. For example, one or more unused bits in the window size IE of an EDGE TBF establishment message may be programmed by the BSS processor 124 to indicate the mobile device 102 is to establish the ongoing validity of missing downlink RLC data blocks based on the maximum data transfer delay constraint. A processor 130 included in the mobile device 102 inspects the appropriate IE in the TBF establishment message to determine whether the mobile device 102 is to establish the ongoing validity of missing downlink RLC data blocks based on the maximum data transfer delay constraint. Otherwise, the mobile device 102 establishes the ongoing validity of missing downlink RLC data blocks based on the conventional sliding RLC window approach.

A timer 132 included in or associated with the mobile device processor 130 supports the timer-based packet retransmission request approach at the mobile device 102 when instructed to do so by the BSS processor 124. The mobile device timer 132 tracks the age of missing downlink RLC data blocks, i.e., RLC data blocks expected, but not yet received by the mobile device 102. A new timer is started each time an RLC data block is initially detected as missing, e.g., as illustrated by Step 300 of FIG. 3. An RLC data block is detected as missing when one or more RLC data blocks are received out-of-order as indicated by the sequence number included as part of each transmitted RLC data block. The mobile device timer 132 is initialized to a value based on the maximum data transfer delay constraint previously received by the mobile device 102. The raw data transfer delay itself may be used as the timer value or the mobile device 102 may take into account typical air interface transmission time intervals to account for time that may already have elapsed (since initial transmission by the BSS) when it detects an RLC data block to be missing.

Figure 3:
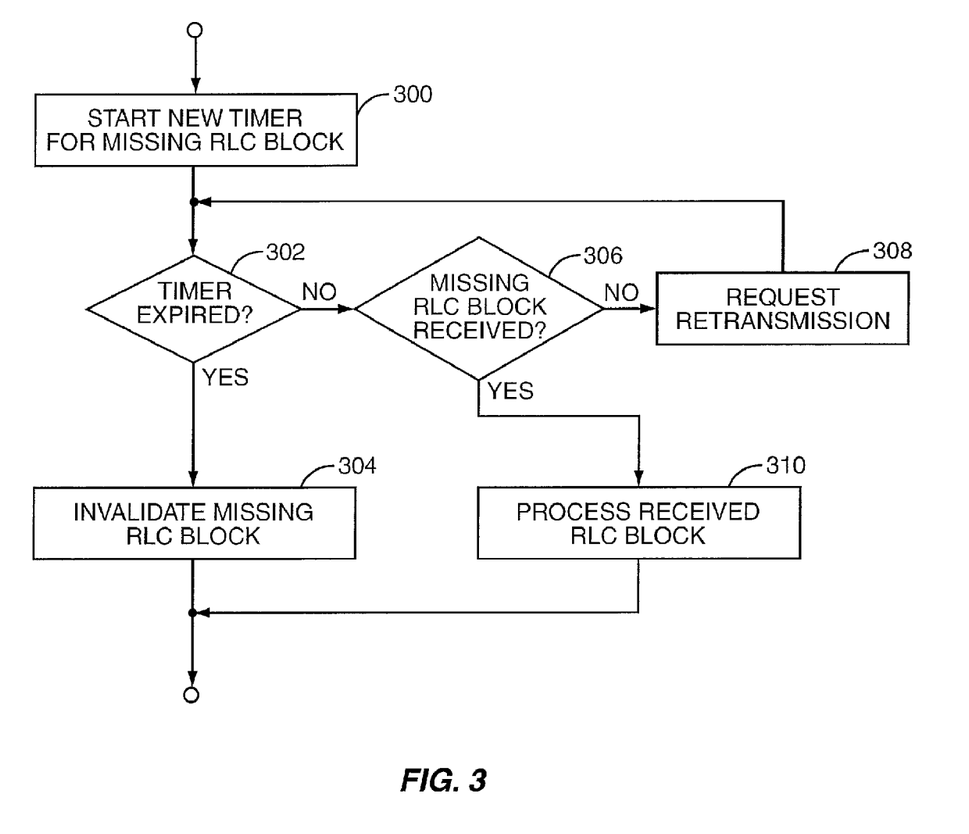
FIG. 3 illustrates an embodiment of processing logic for processing missing data packets at a receiver based on a maximum data transfer delay constraint.

The mobile device processor 130 periodically determines whether the mobile device timer 132 has expired for each detected missing RLC data block, e.g., as illustrated by Step 302 of FIG. 3. If a timer expires before the corresponding RLC data block is received, the missing RLC data block is invalidated by the mobile device processor 130, e.g., as illustrated by Step 304 of FIG. 3. The mobile device 102 no longer expects to receive invalidated RLC data blocks. Instead, the mobile device processor 130 may then generate an incomplete (i.e. erroneous) upper layer PDU instead of sending no upper layer PDU at all.

The mobile device processor 130 continues to expect missing RLC data blocks whose respective timers 132 have not yet expired. If a timer 132 has not expired and the corresponding RLC data block has not yet been received, the mobile device processor 130 requests retransmission of the missing RLC data block, e.g., as illustrated by Steps 306 and 308 of FIG. 3. A missing RLC data block received before its timer 132 expires is considered valid by the mobile device processor 130. A valid RLC data block is processed by removing encapsulation headers as the data packet is processed up the mobile device protocol stack by the mobile device processor 130, e.g., as illustrated by Step 310 of FIG. 3. When transmitting uplink RLC data blocks to the BSS 122, the mobile device 102 also maintains a timer that has the same function as described above for timer 128 in BSS 122. In a similar fashion when receiving uplink RLC data blocks from the mobile device 102, the BSS 122 maintains a timer that has the same function as described above for timer 132 in the mobile device 102.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of transferring upper-layer packet data units (PDUs) associated with a plurality of time-sensitive applications each having a maximum data transfer delay constraint, comprising:
    constructing one or more radio link control (RLC) data blocks from each upper-layer PDU;
    initializing a timer for each RLC data block or group of RLC data blocks associated with the same time-sensitive application, each timer being initialized to a timer value corresponding to the maximum data transfer delay constraint of the time-sensitive application associated with the RLC data block or group of RLC data blocks for which the timer is initialized;
    storing the RLC data blocks for the different time-sensitive applications in a buffer prior to transmission so that RLC data blocks having timers initialized to different timer values are stored in the same buffer;
    starting the timer associated with one of the RLC data blocks or group of RLC data blocks responsive to initial transmission of the RLC data block or group of RLC data blocks;
    re-transmitting an unacknowledged RLC data block so long as the timer associated with the unacknowledged RLC data block has not expired; and
    deleting the unacknowledged RLC data block from the buffer responsive to the timer associated with the unacknowledged RLC data block expiring or a received message indicating reception of the unacknowledged RLC data block.

2. The method of claim 1, further comprising initializing the timer to approximately one hundred milliseconds in the RLC non-persistent mode when the application is voice-over internet protocol based.

3. The method of claim 1, further comprising initializing the timer to approximately three seconds or less in the RLC non-persistent mode when the application is multimedia broadcast multicast service based.

4. The method of claim 1, further comprising transmitting the timer value to one or more wireless receivers configured to receive the upper-layer PDUs.

5. The method of claim 4, wherein transmitting the timer value comprises including the timer value as an information element in a message transmitted to the one or more wireless receivers.

6. The method of claim 4, further comprising instructing the one or more wireless receivers to use the timer value when processing received RLC data blocks.

7. The method of claim 6, wherein instructing the one or more wireless receivers to use the timer value when processing received RLC data blocks comprises programming an information element in a temporary block flow (TBF) establishment message, the information element configured to instruct the one or more wireless receivers to use the timer value when processing missing RLC data blocks.

8. A wireless transmitter for transferring upper-layer packet data units (PDUs) associated with a plurality of time-sensitive applications each having a maximum data transfer delay constraint, the wireless transmitter comprising:
    a timer for each radio link control (RLC) data block or group of RLC data blocks associated with the same time-sensitive application, each timer configured to initialize to a timer value corresponding to the maximum data transfer delay constraint of the time-sensitive application associated with the RLC data block or group of RLC data blocks for which the timer is initialized and start counting responsive to initial transmission of the RLC data block or group of RLC data blocks;

a buffer configured to store the RLC data blocks for the different time-sensitive applications prior to transmission so that RLC data blocks having timers initialized to different timer values are stored in the same buffer; and a processor configured to re-transmit an unacknowledged RLC data block so long as the timer associated with the unacknowledged RLC data block has not expired and delete the unacknowledged RLC data block from the buffer responsive to the timer associated with the unacknowledged RLC data block expiring or a received message indicating reception of the unacknowledged RLC data block.

9. The wireless transmitter of claim 8, wherein the processor is further configured to initialize the timer in the RLC non-persistent mode to approximately one hundred milliseconds when the application is voice-over internet protocol based.

10. The wireless transmitter of claim 8, wherein the processor is further configured to initialize the timer in the RLC non-persistent mode to approximately three seconds or less when the application is multimedia broadcast multicast service based.

11. The wireless transmitter of claim 8, wherein the processor is further configured to transmit the timer value to one or more wireless receivers configured to receive the upper-layer PDUs.

12. The wireless transmitter of claim 11, wherein the processor is configured to include the timer value as an information element in a message transmitted to the one or more wireless receivers.

13. The wireless transmitter of claim 11, wherein the processor is further configured to instruct the one or more wireless receivers to use the timer value when processing received RLC data blocks.

14. The wireless transmitter of claim 13, wherein the processor is configured to program an information element in a temporary block flow (TBF) establishment message, the information element configured to instruct the one or more wireless receivers to use the timer value when processing missing RLC data blocks.

15. A method of receiving one or more upper-layer packet data units (PDUs) from a transmitter which are associated with an application having a maximum data transfer delay constraint, comprising:

detecting at a receiver a missing radio link control (RLC) data block in a sequence of one or more transmitted RLC data blocks associated with the one or more upper-layer PDUs in RLC non-persistent mode;

starting a timer instance at the receiver in the RLC non-persistent mode responsive to detecting the missing RLC data block, the timer initialized to a timer value that is based on the maximum data transfer delay constraint, wherein the timer value is transmitted to the receiver or derived from a transfer delay QoS attribute established at packet data protocol (PDP) context activation; and expecting to receive the missing RLC data block at the receiver in the RLC non-persistent mode until the timer expires.

16. The method of claim 15, further comprising initializing the timer in the RLC non-persistent mode to approximately one hundred milliseconds when the application is voice-over internet protocol based.

17. The method of claim 15, further comprising initializing the timer in the RLC non-persistent mode to approximately three seconds or less when the application is multimedia broadcast multicast service based.

18. The method of claim 15, further comprising retrieving the timer value from an information element included in a received message.

19. The method of claim 15, further comprising indicating missing RLC data blocks are processed based on the timer value.

20. The method of claim 19, wherein indicating missing RLC data blocks are processed based on the timer value comprises generating a message responsive to a received temporary block flow (TBF) establishment message, the TBF establishment message including an information element configured to instruct the use of the timer value when processing missing RLC data blocks.

21. The method of claim 15, further comprising deleting the missing RLC data block from memory in the RLC non-persistent mode responsive to the timer expiring before the missing RLC data block is received.

22. A wireless receiver for receiving one or more upper-layer packet data units (PDUs) associated with an application having a maximum data transfer delay constraint, the wireless receiver comprising a processor configured to:

detect a missing radio link control (RLC) data block in a sequence of one or more transmitted RLC data blocks associated with the one or more upper-layer PDUs in RLC non-persistent mode;

start a timer instance in the RLC non-persistent mode responsive to detecting the missing RLC data block, the timer initialized to a timer value that is based on the maximum data transfer delay constraint, wherein the timer value is transmitted to the wireless receiver or derived from a transfer delay QoS attribute established at packet data protocol (PDP) context activation; and expect to receive the missing RLC data block in the RLC non-persistent mode until the timer expires.

23. The wireless receiver of claim 22, wherein the processor is further configured to initialize the timer in the RLC non-persistent mode to approximately one hundred milliseconds when the application is voice over internet protocol based.

24. The wireless receiver of claim 22, wherein the processor is further configured to initialize the timer in the RLC non-persistent mode to approximately three seconds or less when the application is multimedia broadcast multicast service based.

25. The wireless receiver of claim 22, wherein the processor is further configured to retrieve the timer value from an information element included in a received message.

26. The wireless receiver of claim 22, wherein the processor is further configured to indicate missing RLC data blocks are processed by the wireless receiver based on the timer value.

27. The wireless receiver of claim 26, wherein the processor is configured to generate a message responsive to a received temporary block flow (TBF) establishment message, the TBF establishment message including an information element configured to instruct the wireless receiver to use the timer value when processing missing RLC data blocks.

28. The wireless receiver of claim 22, wherein the processor is further configured to delete the missing RLC data block from memory in the RLC non-persistent mode responsive to the timer expiring before the missing RLC data block is received.

* * * * *

UNITED STATES PATENT AND TRADEMARK OFFICE
CERTIFICATE OF CORRECTION

| | | |
|---|---|---|
| PATENT NO. | : 7,848,287 B2 | Page 1 of 1 |
| APPLICATION NO. | : 11/684020 | |
| DATED | : December 7, 2010 | |
| INVENTOR(S) | : Diachina et al. | |

It is certified that error appears in the above-identified patent and that said Letters Patent is hereby corrected as shown below:

On the Title page, item (56), under "OTHER PUBLICATIONS", in Column 2, Line 5, delete "se;ret-00.txt." and insert -- selret-00.txt, --, therefor.

In Column 2, Line 47, delete "Case 1;" and insert -- Case 1: --, therefor.

In Column 2, Line 57, delete "Case 2;" and insert -- Case 2: --, therefor.

In Column 2, Line 61, delete "Case 3;" and insert -- Case 3: --, therefor.

Signed and Sealed this
Twenty-fifth Day of January, 2011

David J. Kappos
*Director of the United States Patent and Trademark Office*